United States Patent [19]

Tsunoda et al.

[11] 4,426,132
[45] Jan. 17, 1984

[54] PROJECTING DEVICE

[75] Inventors: Atsuo Tsunoda, Fuchu; Koyo Midorikawa, Tokyo; Hidetoshi Murase, Yokohama; Mikid Suzuta; Masazumi Moriwaki, both of Tokyo; Noritaka Mochizuki, Yokohama; Setsuo Minami, Kawasaki; Yoshiya Matsui, Yokohama, all of Japan

[73] Assignee: Canon Kabushiki Kaisha, Tokyo, Japan

[21] Appl. No.: 500,804

[22] Filed: Jun. 7, 1983

Related U.S. Application Data

[63] Continuation of Ser. No. 166,965, Jul. 8, 1980, abandoned.

[30] Foreign Application Priority Data

Jul. 13, 1979 [JP] Japan .................................. 54-89108

[51] Int. Cl.$^3$ ............................................. G02B 27/18
[52] U.S. Cl. ..................... 350/167; 353/101; 355/50
[58] Field of Search .................. 350/167, 96.24, 96.25; 355/1, 50; 353/101

[56] References Cited

U.S. PATENT DOCUMENTS

| | | | |
|---|---|---|---|
| 3,503,666 | 3/1970 | Moore et al. | 350/96.24 |
| 3,580,675 | 5/1971 | Hieber et al. | 350/167 |
| 4,168,900 | 9/1979 | Adachi | 355/1 |
| 4,316,665 | 2/1982 | Mochizuki et al. | 355/50 |
| 4,350,431 | 9/1982 | Mochizuki et al. | 355/50 |

FOREIGN PATENT DOCUMENTS

54-123948  9/1979  Japan ...................................... 355/1

Primary Examiner—Bruce Y. Arnold
Attorney, Agent, or Firm—Fitzpatrick, Cella, Harper & Scinto

[57] ABSTRACT

A projecting device is disclosed which has plural element lens systems arranged in at least two rows in a staggered fashion in two grooved blocks, with one row displaced relative to the adjacent row by a distance equal to half the pitch of the adjacent row. Each lens system is composed of at least one bar lens for imaging a part of the object as a part of the corresponding image. An opaque elastomer material fills the space between the rows for preventing light from entering into the space while allowing the positional relation between the rows to be fine-adjusted.

7 Claims, 12 Drawing Figures

PROJECTING DEVICE

This application is a continuation of application Ser. No. 166,965 filed July 8, 1980, now abandoned.

BACKGROUND OF THE INVENTION

1. Field of the Invention

The present invention relates to a projecting device having plural bar lenses for projecting an image of an object a very short distance.

2. Description of the Prior Art

A compound lens system has been employed for example to reduce the size of a copier etc., and the use of bar lenses is for example disclosed in the U.S. patent application Ser. No. 889,404, (now abandoned) assigned to the assignee of the present application. In a compound bar lens system, two bar lenses are arranged along a common axis to constitute an element lens system for forming a part of the projected image corresponding to a part of the object. In the application of the compound bar lens system to a copier, the space between the element lens systems has to be shielded suitably against light passage, as otherwise the light passing through said space undesirably affects the electrostatic latent image formation on the photosensitive drum, leading to a flare formation on the developed image.

As the light-shielding means for the space between the element lens systems, the U.S. patent application Ser. No. 105,789 (now U.S. Pat. No. 4,275,962) of the present applicants discloses the use of a mask having holes of a pitch equal to the inter-axial distance of the element lens systems, provided at the entrance end of said element lens systems. However the preparation of holes at a pitch equal to that of the element lens systems tends to result in an elevated production cost of the mask. The present invention achieves the same result but with inexpensive means.

SUMMARY OF THE INVENTION

The object of the present invention is to provide a compact projecting device allowing complete light shielding of the space between the element lens systems while not interfering with the effective diameter of said element lens systems. According to the present invention the above-mentioned object can be achieved by arranging the element lens system in an array to constitute a block having U- or V-shaped grooves in determined directions and filling the space between said element lens systems with an opaque elastomer material.

DESCRIPTION OF THE PREFERRED EMBODIMENTS

Figure 1:
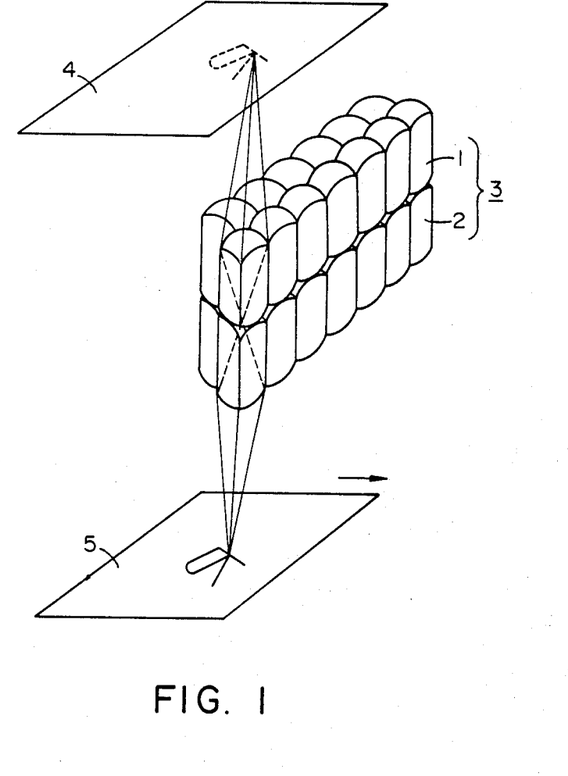
FIG. 1 is a schematic view of a compound bar lens system.

In FIG. 1 showing a compound bar lens system in a schematic view, first bar lenses 1 are substantially structured telecentric at the image field side while second bar lenses 2 are substantially structured telecentric at the object field side. The term substantially telecentric lens means a lens providing an exit or entrance principal ray parallel or substantially parallel to the optical axis. The image-side face of the first bar lens 1 and the object-side face of the second bar lens 2 are so designed as to form an air lens, thereby maximizing the field lens effect by the telecentric system. The first bar lens 1 and the second bar lens 2 constitute an axial element lens system 3. Each element lens system 3 forms an erect, equal-sized image of a partial area of the original plane 4 on a corresponding area of a photosensitive plane 5 constituting the projection plane. In case of a copier utilizing the slit exposure scanning system, the element lens systems are arranged along the slit direction. Preferably the arrangement contains plural rows of such elements in a so-called staggered arrangement in which each row is displaced by a half pitch with respect to its neighboring row or rows in order to obtain uniform distribution, over the entire slit length, of the exposure time-integrated in the scanning direction. FIG. 1 shows a staggered arrangement of two rows. The original plane 4 and the photosensitive plane 5 are displaced at a determined speed in the directions indicated by the arrows.

Figure 2A:
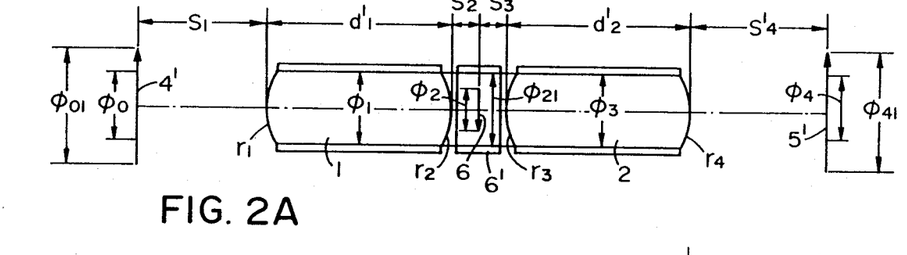
FIGS. 2A, 2B and 2C are optical explanatory views of an element lens system.
Figures 2B, 2C:
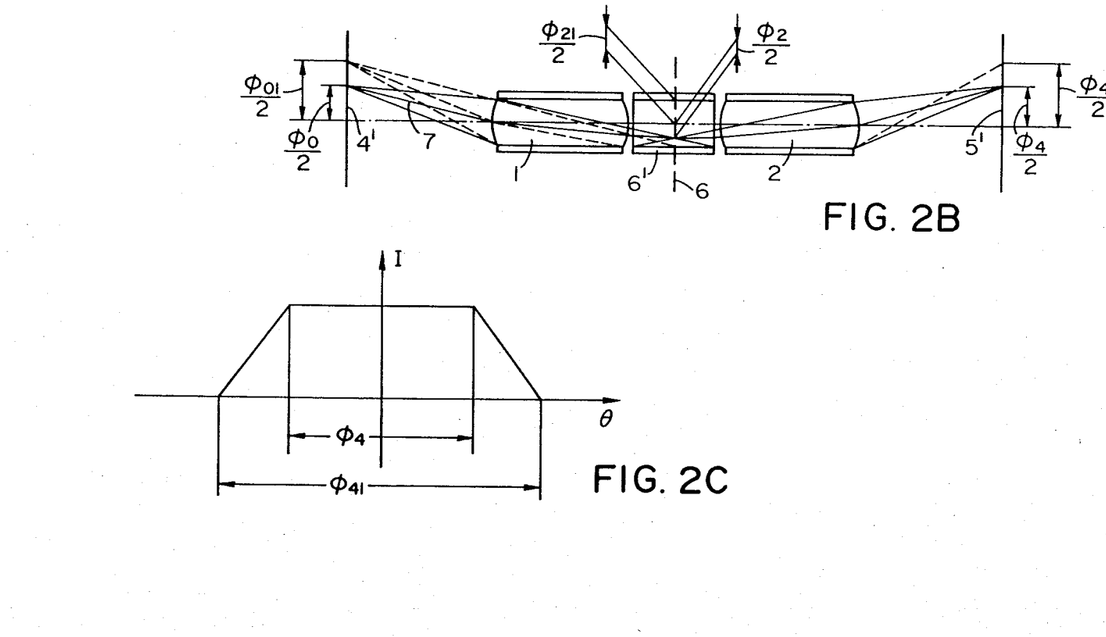
Figure 3A:
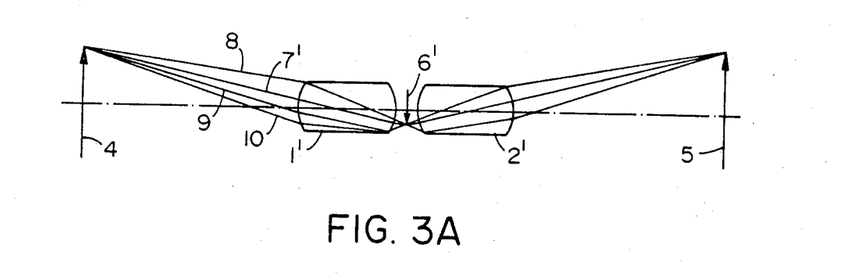
FIGS. 3A and 3B are optical explanatory views of another element lens system.
Figure 3B:
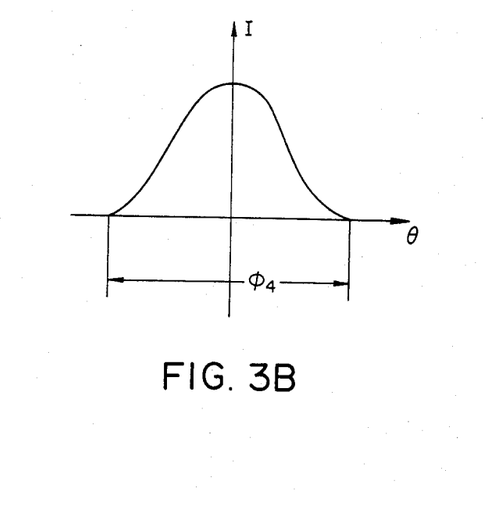

Now reference is made to FIGS. 2 and 3 showing two different kinds of element lens systems 3.

FIG. 2A is an explanatory view showing the parameters of the bar lenses. An intermediate inverted image 6 is formed between the first bar lens 1 and the second bar lens 2. Tracing the light path in FIG. 2B, the imaging principal ray 7, after emerging from the second face of the first bar lens 1, becomes parallel to the optical axis. Thus the object 4' is finally focused as an image 5'. The light intensity distribution on the image plane is uniform within a determined area $\phi_4$ as shown in FIG. 2C, and gradually decreases in the peripheral area to reach zero in the area $\phi_{41}$. The abscissa $\theta$ in FIG. 2C indicates the image angle. In this manner a determined light intensity distribution can be obtained on the image plane by arranging the element lens systems at a determined interval. Now in the following there will be given a detailed explanation on the parameters of the bar lenses.

In FIGS. 2A and 2B it is assumed that the first bar lens 1 is provided with a first face at the object field side with a curvature $r_1$, a second face at the image field side with a curvature $r_2$ (negative in the illustrated case), an axial thickness $d_1'$ between the first and second faces along the optical axis, and a principal refractive index $n_1'$ for a representative design wavelength. The effective diameter of said lens is represented by $\phi_1$, while the size of the object 4' is represented by $\phi_0$, and the size of the intermediate image 6 formed by said lens is represented by $\phi_2$. Also the distance from the first face of said lens to the object 4' is represented by $S_1$ (negative in the illustrated case), and the distance from the second face of said lens to the intermediate image 6 is represented by $S_2'$. Furthermore the lateral magnification of the intermediate image 6 with respect to the object 4' is represented by $\beta_1$ ($= -|\phi_2/\phi_0|$). Fe stands for the effective F-number of said lens at the object side.

The effective F-number is determined from the illuminating condition, i.e.

$$Fe \equiv \frac{(S_1)^2 + \left(\frac{\phi_1}{2}\right)^2}{\phi_1} \quad (1)$$

The lateral magnification $\beta_1$ ($|\beta_1| < 1$) to be determined so as to avoid the peripheral loss of the partial image, the distance $S_1$ to the object and the lens back distance $S_2'$ to the intermediate image are parameters that can be determined in advance. Also the principal refractive index $n_1'$ can be determined by the selection of the lens material. These five parameters $Fe$, $\beta_1$, $S_1$, $S_2'$ and $n_1'$ are utilized in the following manner in the ideal imaging theory for determining the curvature $r_1$ of the first face of the first lens, curvature $r_2$ of the second face thereof, axial thickness $d_1'$, effective diameter $\phi_1$ of the lens and effective partial diameter $\phi_0$ of the object.

At first the relation between the magnification $\beta_1$ and the lens parameters is given by the following equation:

$$\beta_1 = \frac{1}{\{\phi_1 + \phi_2 - \phi_1 e'_1 \phi_2\} S_1 + \{1 - e'_1 \phi_2\}} \quad (2)$$

wherein $$\phi_1 \equiv \frac{n'_1 - 1}{r_1} \text{ (refractive power of first face)}$$

$$\phi_2 \equiv \frac{1 - n'_1}{r_2} \text{ (refractive power of second face)}$$

$$e'_1 \equiv \frac{d'_1}{n'_1}$$

Then the condition that the principal ray 7 entering from the object to the center of the first face emerges from the second face in a state parallel to the optical axis is represented by the following equation in consideration of the fact that this condition is equivalent to that the second focal length ($1/\psi_1$) is equal to $e_1'$:

$$\frac{1}{\phi_2} = e'_1 \quad (3)$$

Then the condition that the beam entering the first lens from the end of the object of effective diameter $\phi_2$ is not hindered is represented by the following equation, in consideration of the fact that the lowermost ray of the light beam proceeds, after passing through the first face, along the brim of the first bar lens which is parallel to the optical axis:

$$\phi_1 = -\frac{1}{S_1}\left(1 + \frac{\phi_0}{\phi_1}\right) \quad (4)$$

Finally the following relationship is required in order to maintain an appropriate distance $S_2'$ between the second face of the first bar lens and the position of the intermediate image:

$$S_2' = \beta_1 \times \{(1 - \psi_1 e_1')S_1 - e_1'\} \quad (5)$$

The foregoing equations (1) to (5) are solved in combination to obtain the following results:

$$r_1 = (n'_1 - 1) \times \frac{\beta_1 S_1}{\left[(1 - \beta_1) - \frac{S'_2}{\beta_1 S_1}\right]} \quad (10)$$

$$r_2 = (1 - n'_1) \times \beta_1 S_1$$

$$d'_1 = n'_1 \times \beta_1 S_1$$

$$\phi_1 = \frac{-S_1/Fe}{\sqrt{1 - \left(\frac{1}{2Fe}\right)^2}}$$

$$\phi_0 = \left[\frac{\left(\frac{S'_2}{\beta_1}\right) - S_1}{\beta_1 S_1} \times \phi_1\right]$$

Now there will be explained the second bar lens 2, with the symbols shown in FIG. 2A.

It is assumed that the second bar lens 2 is provided with a first face at the object field side with a curvature $r_3$, a second face at the image field side with a curvature $r_4$ (negative in the illustrated case), an axial thickness $d_2'$ between the first and second faces along the optical axis, and a principal refractive index $n_2'$ for a representative design wavelength. The effective diameter of said lens is represented by $\phi_3'$ while the size of the projected image on the image plane with respect to the second bar lens is represented by $\phi_4$. Also the distance from the first face of said lens to the intermediate image 6 is represented by $S_3$ (negative in the illustrated case), while the distance from the second face thereof to the projected image is represented by $S_4'$, and the lateral magnification of the projected image 5' with respect to the intermediate image 6 is represented by $\beta_2 (= -|\phi_4/\phi_2|)$. Also $F_e$ stands for the effective F-number of said lens at the image field side.

The effective F-number is determined from the illuminating conditions, i.e.

$$Fe' \equiv \frac{\sqrt{(S'_4)^2 + \left(\frac{\phi_3}{2}\right)^2}}{\phi_3} \quad (11)$$

The lateral magnification $\beta_2$ ($|\beta_2| > 1$) to be determined so as to avoid the peripheral loss of the partial image, the distance $S_3$ to the intermediate image and the lens back distance $S_4'$ to the projection plane are parameters that can be determined in advance. Also the principal refractive index $n_2'$ can be determined by the selection of the lens material. These five parameters $Fe'$, $\beta_2$, $S_3$, $S_4'$ and $n_2'$, are utilized in the following manner in the ideal imaging theory for determining the curvature $r_3$ of the first face of the second bar lens 2, curvature $r_4$ of the second face thereof, axial thickness $d_2'$, effective diameter $\phi_3$ and effective partial diameter $\phi_4$ of the projected image.

At first the relation between the lateral magnification $\beta_2$ and the lens parameter is given by the following equation:

$$\frac{1}{\beta_2} = \frac{1}{\{\phi_3 + \phi_4 - \phi_3 e'_2 \phi_4\}(-S'_4) + \{1 - e'_2 \phi_3\}} \quad (12)$$

-continued wherein $$\begin{cases} \phi_3 \equiv \dfrac{n'_2 - 1}{r_3} \text{ (refractive power of first face)} \\ \phi_4 \equiv \dfrac{1 - n'_2}{r_4} \text{ (refractive power of second face)} \\ e'_2 \equiv \dfrac{d'_2}{n'_2} \end{cases}$$

Then, in order that the incident beam having a principal ray parallel to the optical axis can effectively pass through the second bar lens with respect to the effective diameter $\phi_3$ thereof, the exit pupil is present preferably on the second face of said second bar lens. Since this requirement is equivalent to the focal distance, $(1/\psi_3)$ being equal to $e_2'$, there can be obtained the following equation:

$$\frac{1}{\phi_3} = e'_2 \tag{13}$$

Then the condition that the beam entering the second bar lens 2 from the periphery of the effective intermediate image diameter $\phi_2$ is not hindered is represented by the following equation, in consideration of the fact that the lowermost ray of the light beam proceeds, after passing through the first face, along the brim of the second bar lens 2 parallel to the optical axis:

$$\phi_4 = \frac{1}{S'_4}\left(1 + \frac{\phi_4}{\phi_3}\right) \tag{14}$$

Finally the following relationship is required in order to maintain an appropriate distance $S_3$ between the first face of the second bar lens 2 to the intermediate image:

$$S_3 = 1/\beta_2 \times \{(1 - \psi_4 e_2')S_4' + e_2'\} \tag{15}$$

The foregoing equations (11) to (15) are solved in combination to obtain the following results:

$$r_3 = (1 - n'_2) \times \frac{S'_4}{\beta_2} \tag{16}$$

$$r_4 = (n'_2 - 1) \times \frac{S'_4/\beta_2}{\left[\left(1 - \dfrac{1}{\beta_2}\right) - \dfrac{S_3 \times \beta_2}{S'_4}\right]} \tag{17}$$

$$d'_2 = -n'_2 \times S'_4/\beta_2 \tag{18}$$

$$\phi_3 = \frac{S'_4/Fe'}{\sqrt{1 - \left(\dfrac{1}{2Fe'}\right)^2}} \tag{19}$$

$$\phi_4 = \left[\frac{S_3\beta_2 - S'_4}{S'_4/\beta_2}\right] \times \phi_3 \tag{20}$$

In this manner, in the element lens system composed of the first bar lens 1 and the second bar lens 2, said first bar lens forms the intermediate image 6 (image diameter $\phi_2$) of the object 4' (object diameter $\phi_0$), and said intermediate image 6 is relayed by the second bar lens 2 to losing image plane 5' as an erect image of diameter $\phi_4$, without losing the uniformity in light intensity. It is to noted however that a relation $\beta_1 \times \beta_2 = +1$, indicating the image magnification of unity, has to be satisfied in order that the image of the entire object plane can be correctly formed on the projection plane by means of an arrangement of plural element lens systems each composed of first and second bar lenses. Consequently the first and second bar lenses have to be so arranged to satisfy the following equation:

$$\beta_2 = \frac{1}{\beta_1} \tag{21}$$

In such arrangement it will be evident that Fe' automatically becomes equal to Fe.

In summary, in the element lens system composed of the first bar lens 1 and the second bar lens 2 and capable of forming an erect image with the image magnification equal to unity, the parameters $\beta_2$ and Fe' of the second bar lens 2 are automatically determined if the parameters $\beta_1$ and Fe of the first bar lens 1 are suitably selected. It is to be noted however that other parameters $S_1$, $S_2'$ and $n_1'$, of the first bar lens 1 and those $S_3$, $S_4'$ and $n_2'$ of the second bar lens 2 can be suitably selected in a mutually independent manner.

In general it is not desirable, from the standpoint of manufacture, to adopt different structures for the first and second bar lenses, since there will be required the preparation of two different lenses.

For this reason there can be considered, for the above-mentioned element lens system composed of the first and second bar lenses, a coaxial optical system symmetrical to the plane of the intermediate image. In such arrangement the second lens can be identical with the first lens. Thus the parameters of said second lens are related with those of the first lens in the following manner:

$$r_3 = -r_2,\ r_4 = -r_1,\ d_2' = d_1',\ n_2' = n_1',\ \phi_3 = \phi_1,$$
$$\phi_4 = \phi_0,\ \beta_2 = 1/\beta_1,\ S_3 = -S_2',\ S_4' = -S_1,\ Fe' = Fe,$$

thus allowing simplification of the projection system.

In addition the present inventors have experimentally confirmed that the parameters of the first and second bar lenses may have certain deviations in the order of ±10% from the conditions defined by the foregoing equations (6) to (10) and (16) to (20), as represented in the following:

$$K_1 \times (n'_1 - 1) \times \frac{\beta_1 S_1}{\left[(1 - \beta_1) - \dfrac{S'_2}{\beta_1 S_1}\right]} \leqq r_1 \leqq K_2 \times$$

$$(n'_1 - 1) \times \frac{\beta_1 S_1}{\left[(1 - \beta_1) - \dfrac{S'_2}{\beta_1 S_1}\right]}$$

$$K_1 \times (1 - n'_1) \times \beta_1 S_1 \geqq r_2 \geqq K_2 \times (1 - n'_1) \times \beta_1 S_1$$

$$K_1 \times n'_1 \times \beta_1 S_1 \leqq d'_1 \leqq K_2 \times n'_1 \times \beta_1 S_1$$

$$K_1 \times \frac{(-S_1/Fe)}{\sqrt{1 - \left(\dfrac{1}{2Fe}\right)^2}} \leqq \phi_1 \leqq K_2 \times \frac{(-S_1/Fe)}{\sqrt{1 - \left(\dfrac{1}{2Fe}\right)^2}}$$

-continued $$K_1 \times \left[ \frac{\left(\frac{S'_2}{\beta_1}\right) - S_1}{\beta_1 S_1} \right] \times \phi_1 \leq \phi_0 \leq K_2 \times$$

$$\left[ \frac{\left(\frac{S'_2}{\beta_1}\right) - S_1}{\beta_1 S_1} \right] \times \phi_1$$

$$K_1 \times (1 - n'_2) \times \frac{S'_4}{\beta_2} \leq r_3 \leq K_2 \times (1 - n'_2) \times \frac{S'_4}{\beta_2}$$

$$K_1 \times (n'_2 - 1) \times \frac{S'_4/\beta_2}{\left[\left(1 - \frac{1}{\beta_2}\right) - \frac{S_3 \times \beta_2}{S'_4}\right]} \geq r_4 \geq K_2$$

$$(n'_2 - 1) \times \frac{S'_4/\beta_2}{\left[\left(1 - \frac{1}{\beta_2}\right) - \frac{S_3 \times \beta_2}{S'_4}\right]}$$

$$-n'_2 \times S'_4/\beta_2 \times K_1 \leq d'_2 \leq K_2 \times (-n'_2) \times S'_4/\beta_2$$

$$\frac{S'_4/Fe'}{\sqrt{1 - \left(\frac{1}{2Fe'}\right)^2}} \times K_1 \leq \phi_2 \leq \frac{S'_4/Fe'}{\sqrt{1 - \left(\frac{1}{2Fe'}\right)^2}} \times K_2$$

$$\left[ \frac{S_3\beta_2 - S'_4}{S'_4/\beta_2} \right] \times \phi_3 \times K_1 \leq \phi_4 \leq \left[ \frac{S_3\beta_2 - S'_4}{S'_4/\beta_2} \right] \times \phi_3 \times K_2$$

wherein $K_1 = 0.9$, and $K_2 = 1.1$.

In the attached drawing, 6' represents an intermediate ring to be explained later.

Also a uniform light intensity with fluctuation not exceeding several percent can be achieved by selecting the pitch $P_1$ of the arrangement of the element lens system so as to satisfy the following relation:

$$K_1 \times \frac{\phi_{01}}{2} \leq P_1 \leq K_2 \times \frac{\phi_{01}}{2} \quad (K_1 = 0.9, K_2 = 1.1)$$

wherein $\phi_{01}$ is the effective object field.

Now reference is made to FIG. 3A showing another element lens system.

In this embodiment the element optical systems, each showing the light intensity of Gaussion distribution on the projection plane, are arranged at a determined interval and in plural rows, whereby the effective object fields of said systems mutually overlap to provide a substantially flat integrated light intensity over the entire array. The element lens system employs the lenses of a small lateral magnification for increasing the effective object field, and is so designed as to provide a light intensity of a Gaussian distribution on the image plane thereby achieving a uniform light intensity in the overlapping partial projected images, as shown in FIG. 3B. Now there will be explained the parameters of the bar lenses constituting such system.

In the present embodiment, the principal ray is defined as a ray emerging from the second face of the first bar lens 1' at a certain height and proceeding parallel to the optical axis to the second bar lens 2', said height being positioned at the center between the emerging height from said second face of a ray entering the upper end of the first face of the first bar lens 1' from the end of the effective object field and the emerging height from said second face of a ray passing through the lower end of said second face from the end of the effective object field.

In the following calculations are shown for obtaining the parameters $r_1$, $r_2$, $d_1'$, $\phi_1$ and $\phi_0$. Firstly, from the definition of F-number there can be obtained:

$$Fe = \frac{\sqrt{S_1^2 + \left(\frac{\phi_1}{2}\right)^2}}{\phi_1} \quad (22)$$

Also from the paraxial approximation there can be obtained:

$$\beta_1 = \frac{1}{(\phi_1 + \phi_2 - \phi_1 e'_1 \phi_2)S_1 + (1 - e'_1 \phi_2)} \quad (23)$$

wherein $\phi_1 = \frac{n'_1 - 1}{r_1}$ (refractive power of first face)

$\phi_2 = \frac{1 - n'_1}{r_2}$ (refractive power of second face)

$e'_1 = \frac{d'_1}{n'_1}$

Then the following equations are obtained from the condition that the principal ray of the effective incident beam from the object becomes parallel to the optical axis after emerging from the second face:

$$\phi_2 = \frac{2}{e'_1} \quad (24)$$

$$\phi_1 = -\frac{1}{S_1} \quad (25)$$

Also the following relation is required from the condition that the aperture efficiency at the maximum image angle becomes zero:

$$\phi_0 = \frac{-2 \times S_1 \times \phi_1}{e'_1} \quad (26)$$

Finally the following relation is required in order to maintain an appropriate distance $S_2'$ from the second face of the first bar lens 1' to the intermediate image position:

$$S'_2 = \frac{1}{\phi_2} \quad (27)$$

The foregoing equations (22) to (27) are solved to obtain the following results:

$$r_1 = -(n'_1 - 1)S_1 \quad (28)$$

$$r_2 = S_1 \times \beta_1 \times (1 - n'_1) \quad (29)$$

$$d'_1 = 2 \times n'_1 \times S_1 \times \beta_1 \quad (30)$$

$$\phi_1 = \frac{-S_1/Fe}{\sqrt{1 - \left(\frac{1}{2Fe}\right)^2}} \quad (31)$$

-continued $$\phi_0 = -\frac{\phi_1}{\beta_1} \quad (32)$$

Now there will be given an explanation on the second bar lens 2', with the symbols shown in FIG. 2A.

The effective F-number can be determined from the conditions on the light intensity of the projected image in the following manner:

$$Fe' = \frac{\sqrt{(S'_4)^2 + \left(\frac{\phi_3}{2}\right)^2}}{\phi_3} \quad (33)$$

The lateral magnification $\beta_2$ ($|\beta_2|>1$) of the projected image, the distance $S_3$ from the intermediate image to the lens face at the object field side, and the distance $S_4'$ behind the lens to the projection plane are parameters which can be determined in advance. Also the principal refractive index $n_2'$ is determined by the selection of the lens material. These parameters $Fe'$, $\beta_2$, $S_3$, $S_4'$ and $n_2'$ are utilized for determining the curvature $r_3$ of the first face of the second bar lens 2', curvature $r_4$ of the second face thereof, axial thickness $d_2'$ of the second bar lens 2', effective diameter $\phi_3$ thereof, and effective partial diameter $\phi_4$ of the projected image according to the ideal imaging theory in the following manner.

Firstly the relation between the lateral magnification $\beta_2$ and the parameters of the first bar lens 1' is given by the following equation:

$$\frac{1}{\beta_2} = \frac{1}{(\phi_3 + \phi_4 - \phi_3 e'_2 \phi_4)(-S'_4) + (1 - e'_2 \phi_3)} \quad (34)$$

wherein $$\phi_3 \equiv \frac{n'_2 - 1}{r_3} \text{ (refractive power of first face)}$$

$$\phi_4 \equiv \frac{1 - n'_2}{r_4} \text{ (refractive power of second face)}$$

$$e'_2 \equiv \frac{d'_2}{n'_2}$$

Then the following equations are obtained from the condition that the principal ray of the effective incident beam from the object is to be parallel to the optical axis when entering the first face of the second bar lens 2':

$$\phi_3 = \frac{2}{e'_2} \quad (35)$$

$$\phi_4 = \frac{1}{S'_4} \quad (36)$$

Also there is required the following relation from the condition that the aperture efficiency is equal to zero at the maximum imaging angle:

$$\phi_4 = \frac{2 \times S'_4 \times \phi_3}{e'_2} \quad (37)$$

Finally there is required the following relation in order to maintain an appropriate distance $S_3$ from the first face of the second bar lens 2' to the intermediate image position:

$$S_3 = -\frac{1}{\phi_3} \quad (38)$$

The foregoing equations (33) to (38) are solved in combination to obtain the following results:

$$r_3 = S'_4 \times \frac{1}{\beta_2} \times (1 - n'_2) \quad (39)$$

$$r_4 = (1 - n'_2) \times S'_4 \quad (40)$$

$$d'_2 = -2 \times n'_2 \times S'_4 \times \frac{1}{\beta_2} \quad (41)$$

$$\phi_3 = \frac{S'_4/Fe'}{\sqrt{1 - \left(\frac{1}{2Fe}\right)^2}} \quad (42)$$

$$\phi_4 = -\beta_2 \times \phi_3 \quad (43)$$

In this manner, in the element lens system composed of the first bar lens 1' and the second bar lens 2', the first bar lens 1' forms the intermediate image (image diameter $\phi_2$) of the object (diameter $\phi_0$), and said intermediate image is relayed by the second bar lens 2' onto the image plane as an erect image of diameter $\phi_4$. In such case it is to be noted that a relation $\beta_1 \times \beta_2 = +1$ is required in order to form the image of the entire object plane correctly on the projection plane by means of an arrangement of plural element lens systems each composed of the first and second bar lenses, said relation indicating the formation of an erect image with the magnification of unity. Consequently the first bar lens 1' and the second bar lens 2' have to be so arranged as to satisfy the following equation:

$$\beta_2 = 1/\beta_1 \quad (44)$$

In such arrangement it will be evident that $Fe'$ becomes equal to $Fe$. Also the projection system can be simplified by adopting the following conditions, as already explained in the foregoing:

$$r_3 = -r_2, \; r_4 = -r_1, \; d'_2 = d'_1, \; n'_2 = n'_1, \; \phi_3 = \phi_1,$$
$$\phi_4 = \phi_0, \; \beta_2 = 1/\beta_1, \; S_3 = -S'_2, \; S'_4 = -S_1, \; Fe' = Fe$$

In addition the present inventors have experimentally confirmed that the first and second bar lenses may contain certain deviation of $\pm 10\%$ from the conditions defined in the foregoing equations (28) to (32) and (39) to (43) as defined in the following:

$$-K_1 \times S_1 \times (n'_1 - 1) \leq r_1 \leq -K_2 \times S_1 \times (n'_1 - 1)$$

$$K_2 \times S_1 \times \beta_1 \times (1 - n'_1) \leq r_2 \leq K_1 \times S_1 \times \beta_1(1 - n'_1)$$

$$2 \times K_1 \times n'_1 \times S_1 \times \beta_1 \leq d'_1 \leq 2 \times K_2 \times n'_1 \times S_1 \times \beta_1$$

$$K_1 \times \frac{-S_1/Fe}{\sqrt{1 - \left(\frac{1}{2Fe}\right)^2}} \leq \phi_1 \leq K_2 \times \frac{-S_1/Fe}{\sqrt{1 - \left(\frac{1}{2Fe}\right)^2}}$$

$$K_1 \times \frac{\phi_1}{\beta_1} \leq \phi_0 \leq -K_2 \times \frac{\phi_1}{\beta_1}$$

-continued
$$K_1 \times S'_4 \times \frac{1}{\beta_2} \times (1 - n'_2) \leq r_3 \leq K_2 \times$$

$$S'_4 \times \frac{1}{\beta_2} \times (1 - n'_2) \quad 5$$

$$K_2 \times S'_4 \times (1 - n'_2) \leq r_4 \leq K_1 \times S'_4 \times (1 - n'_2)$$

$$-2 \times K_1 \times n'_2 \times S'_4 \times \frac{1}{\beta_2} \leq d'_2 \leq -2 \times$$

$$K_2 \times n'_2 \times S'_4 \times \frac{1}{\beta_2}$$

$$K_1 \times \frac{S'_4/Fe'}{\sqrt{1 - \left(\frac{1}{2Fe'}\right)^2}} \leq \phi_3 \leq K_2 \times \frac{S'_4/Fe'}{\sqrt{1 - \left(\frac{1}{2Fe'}\right)^2}}$$

$$-K_1 \times \beta_2 \times \phi_3 \leq \phi_4 \leq -K_2 \times \beta_2 \times \phi_3$$

wherein $K_1 = 0.9$ and $K_2 = 1.1$.

Also a uniform light intensity with fluctuation within several percent can be obtained if the arranging pitch P of the element lens systems is so selected as to satisfy the following relation:

$$N_1 \times \phi_1 \leq P \leq N_2 \times \phi_1$$

wherein $N_1 = 1.18$ and $N_2 = 1.36$.

Figure 4:
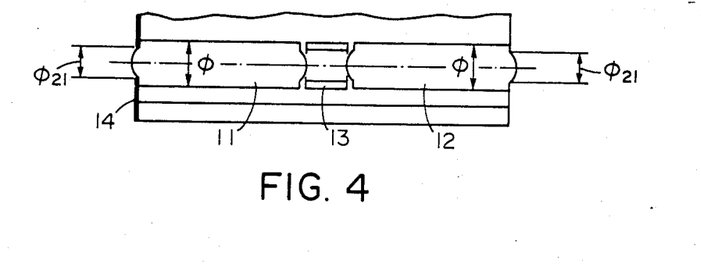
FIG. 4 is a schematic view of a bar lens structure.

Although the foregoing explanation is solely based on the effective diameter of the bar lenses, the actual diameter $\phi$ of said lenses may be selected larger than the effective diameter $\phi_{21}$ as shown in FIG. 4, in which case the area on the end faces of said lenses outside said effective diameter $\phi_{21}$ may be formed as a coarse light-diffusing surface or a light-absorbing surface with a black paint, thus effectively prohibiting the light transmission. Also the outer periphery of the bar lenses is for example coated with a black paint for absorbing the stray light. In this manner the light beam transmitted by the first bar lens 11 to the image plane is limited to that passing through the area inside the effective diameter $\phi_{21}$. Consequently the ray overflowing the area of the effective diameter $\phi_{21}$ after entering the first face of the bar lens is dissipated at the outer periphery and is not transmitted to the image plane. Between said first bar lens 11 and the second bar lens 12 there is provided an intermediate ring 13, which is spaced by small gaps from said bar lenses. The internal diameter of intermediate ring 13 is selected equal to or slightly larger than the effective diameter of said bar lenses, and the internal surface of said intermediate ring is provided for example with mat coating.

On the other hand the external diameter is selected substantially equal to the external diameter of said bar lenses. Said intermediate ring functions to prevent the entry of light from the first bar lens 11 into the second bar lenses 12 of other element lens systems, thus preventing the formation of flare or ghosting. However the flare etc. can be ignored to some extent in certain photosensitive members, and in such case the intermediate ring may be dispensed with for achieving a lower production cost.

Figure 5:
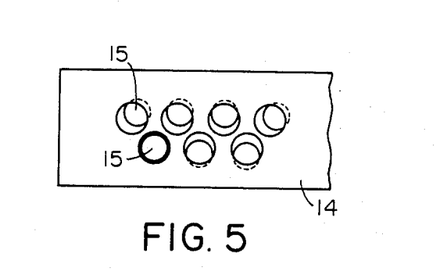
FIG. 5 is a schematic view of a mask proposed as an example of the light-shielding means.

A mask 14 is provided at the entrance end of the element lens system for preventing the entry of light into the space between the element lens systems, and is provided with apertures 15 of a distance corresponding to the interaxial distance of said element lens systems, as shown in FIG. 5. However the support member for the bar lenses has a length generally in excess of 300 mm, and the center of the mask aperture may become displaced from the optical axis of the bar lens to obstruct the effective aperture thereof because of the bending etc. of said support member. The means required for compensating such bending is generally complicated, and the use of the mask 14 itself increases the cost.

Now there will be explained an embodiment of the present invention while making references to FIGS. 6 to 8.

Figure 6:
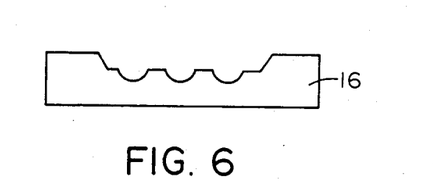
FIGS. 6 to 8 are views showing embodiments of the present invention.

FIG. 6 shows a grooved block 16 having U-shaped grooves along which the bar lenses are to be arranged.

Figure 7:
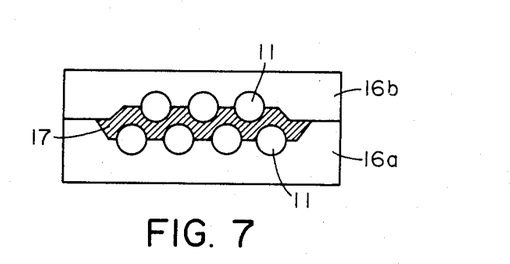
Figure 8:
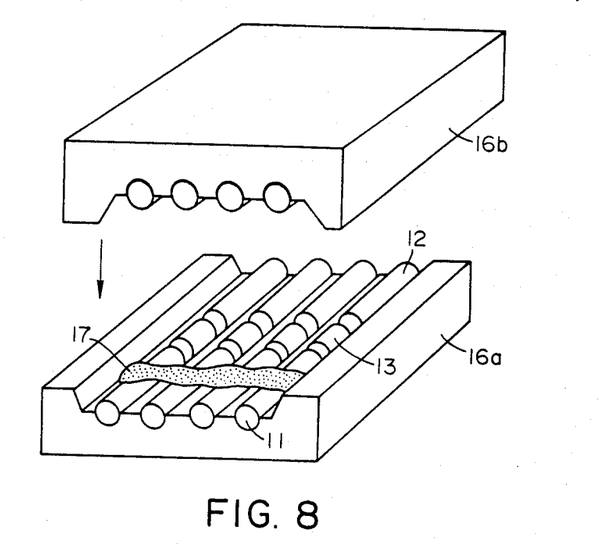

FIG. 7 shows a view seen from the entrance end in which grooved blocks 16a, 16b having U-shaped grooves are combined to support two rows of element lens systems in a staggered fashion. The space between the element lens systems is filled with an opaque elastomer material 17 for example silicone resin commercially available as corking material. Also there may be employed polyvinyl acetate or an elastic epoxy resin. The bar lenses are precisely fixed in advance with an adhesive material along the grooves of said grooved blocks. The elastomer material, not being completely solidified but leaving certain compliance, permits suppression of shock to the bar lenses at the time of minute adjustment of the grooved blocks 16a, 16b. Such compliance of the elastomer material between the element lens systems is also desirable for absorbing thermal expansion or contraction of the grooved blocks. Said elastomer material is extended in an oblong manner along the periphery of plural first bar lenses 11 at the entrance side in such a manner that the effective light beam is not obstructed when the grooved blocks 16a, 16b are mutually combined. Naturally said elastomer material may be provided along the plural second bar lenses at the exit side. After said elastomer material is extended, the grooved blocks 16a, 16b are mutually combined. In the foregoing there has been explained the use of grooved blocks with U-shaped grooves, but practically acceptable light shielding is also possible in case of blocks provided with V-shaped grooves.

Figure 9:
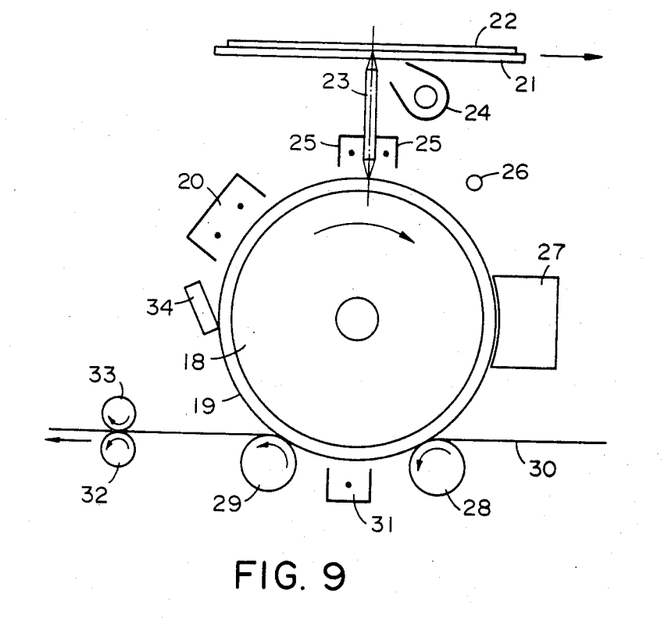
FIG. 9 is a schematic view of a copier in which the present invention is applied.

Now there will be given an explanation on the process in a copier in which the present invention is applied as shown in FIG. 9.

In FIG. 9, a drum 18 is rotated by an unrepresented motor in the direction of the arrow at a constant speed and is provided on the periphery thereof with a photosensitive member 19 having a laminar structure composed in succession of a conductive substrate, a photoconductive layer and a surface transparent insulating layer. The surface of said photosensitive member 19 is at first charged uniformly by a corona discharger 20 in positive or negative polarity respectively when said photoconductor is N-type or P-type. Successively said photoconductive member 19 is exposed to an image of an original 22 placed on a transparent original carriage 21 displaced in the direction of the arrow in synchronization with the rotation of said drum 18 and at a speed equal to the peripheral speed of the drum 18 multiplied by the reciprocal of the image magnification (same speed in case the image magnification is unity), said image being focused on the photosensitive member 19 by means of a projecting device 23. The area of said original 22 facing the projecting device 23, i.e. the area to be imaged on the photosensitive member 19, is illuminated by an illuminating system 24 composed of a lamp and a reflector. The amount of exposure to said photosensitive member 19 can be adjusted for example by regulating the intensity of illuminating light.

Simultaneously with said imagewise exposure by the projecting device 23, the photosensitive member 19 is subjected to charge elimination with an AC corona discharger or a corona discharger 25 of a polarity opposite to that of said corona discharger 20, whereby a charge pattern corresponding to the image on the original 22 is formed on the photosensitive member 19. Said member 19 is further subjected to a whole-surface exposure by a lamp 26 to form thereon an electrostatic latent image of increased contrast. The latent image thus formed is developed as a visible toner image by a developing station 27 utilizing the cascade process or magnet brush process. Said toner image is transferred onto a transfer sheet 30 supplied from unrepresented supply means, and advanced at the same speed as that of the photosensitive member 19 while being maintained in contact therewith by means of rollers 28, 29. In order to improve the transfer efficiency a discharge of a polarity opposite to that of the toner constituting said toner image is provided by a corona discharger 30 to the rear face of the transfer sheet 30 at the transfer position. The toner image transferred onto the transfer sheet 30 is fixed in a suitable fixing station for example a thermal fixing device provided that a pair of rollers 32, 33 maintained in contact with said transfer sheet, and the sheet is thereafter transported to unrepresented storage means.

The photosensitive member after the image transfer is subjected to a cleaning step for removing the remaining toner with an elastic blade 34 maintained in contact with the photosensitive member, and is readied for re-use in the above-explained imaging cycle. The above-mentioned corona discharger 25 is positioned to effect charge elimination simultaneously with the imagewise exposure, but it may also be positioned between the charger 20 and the projecting device for effecting the charge elimination prior to the imagewise exposure. In such case the lamp 26 is not needed. Also the photosensitive member 19 may be of the type not having the surface insulating layer. In such case the corona discharger 25 and the lamp 26 can be dispensed with.

As explained in the foregoing, the present invention allows for a compact projecting device capable of achieving complete light shielding in the space between the element lens systems in an inexpensive manner.

What we claim is:

1. A projecting device, comprising:
   plural element lens systems, each system composed of at least one bar lens adapted for imaging a part of the object as a part of a corresponding projected image, each bar lens having an axial length larger than its effective diameter; wherein said plural element lens systems, when viewed from one end, are arranged in at least two rows and in a staggered fashion with one row displaced relative to the adjacent row by a distance equal to half the pitch of the adjacent row;
   two grooved blocks in face to face relation for arranging said plural element lens systems with the grooves of said blocks defining two rows which extend in a particular direction perpendicular to the optical axes of said systems; and
   an opaque elastomer material filled in the space between the rows of said element lens systems for preventing light from entering into the space and for permitting fine adjustment of the grooved blocks.

2. A projecting device according to claim 1, wherein each lens system includes first and second bar lenses arranged along a common optical axis and further comprising an intermediate ring provided between said first and second bar lenses in each lens system for guiding an effective light beam within the effective diameter of the associated first and second bar lenses, the internal diameter of each intermediate ring being selected so as to be equal to or slightly greater than the effective diameter of its associated first and second bar lenses.

3. A projecting device according to claim 2, wherein each row is displaced with respect to an adjacent row by a distance equal to half of the pitch of the adjacent row.

4. A projecting device according to claim 2, wherein the first bar lens satisfies at the entrance side the following conditions:

$$K_1 \times (n'_1 - 1) \times \frac{\beta_1 S_1}{(1 - \beta_1) - \frac{S_2}{\beta_1 S_1}} \leq r_1 \leq K_2 \times (n'_1 - 1) \times \frac{\beta_1 S_1}{(1 - \beta_1) - \frac{S_2}{\beta_1 S_1}}$$

$$K_2 \times (1 - n'_1) \times \beta_1 S_1 \leq r_2 \leq K_1 \times (1 - n'_1) \times \beta_1 S_1$$

$$K_1 \times n'_1 \times \beta_1 S_1 \leq d'_1 \leq K_2 \times n'_1 \times \beta_1 S_1$$

$$K_1 \times \frac{-S_1/Fe}{1 - \left(\frac{1}{2Fe}\right)^2} \leq \phi_1 \leq K_2 \times \frac{-S_1/Fe}{1 - \left(\frac{1}{2Fe}\right)^2}$$

$$K_1 \times \frac{\frac{S'_2}{\beta_1} - S_1}{\beta_1 S_1} \times \phi_1 \leq \phi_0 \leq K_2 \times \frac{\frac{S'_2}{\beta_1} - S_1}{\beta_1 S_1} \times \phi_1$$

in which;
- $r_1$ is the radius of curvature of the first face of the first bar lens;
- $r_2$ is the radius of curvature of the second face thereof;
- $d_1'$ is the axial thickness between the first and second faces thereof;
- $\phi_1$ is the effective diameter thereof;
- $\phi_0$ is the size of the object;
- $n_1'$ is the refractive index of the material of the first bar lens for the design wavelength;
- $\beta_1$ is the lateral magnification of the first bar lens;
- $S_1$ is the axial distance from the first face of the first bar lens to the object;
- $S_2$ is the axial distance from the second face of the first bar lens to an intermediate image formed between the first bar lens and the second bar lens at the exit side plane;
- Fe is the effective F-number at the object side;
- $K_1$ is 0.9; and
- $K_2$ is 1.1;

and wherein the second bar lens satisfies the following conditions:

$$K_1 \times (1 - n'_2) \times \frac{S'_4}{\beta_2} \leq r_3 \leq K_2 \times (1 - n'_2) \times \frac{S'_4}{\beta_2}$$

-continued $$K_2 \times (n'_2 - 1) \times \frac{S'_4/\beta_2}{\left(1 - \frac{1}{\beta_2}\right) - \frac{S_3 \times \beta_2}{S'_4}} \leq r_4 \leq K_1 \times$$

$$(n'_2 - 1) \times \frac{S'_4/\beta_2}{\left(1 - \frac{1}{\beta_2}\right) - \frac{S_3 \times \beta_2}{S'_4}}$$

$$K_1 \times n'_2 \times S'_4/\beta_2 \leq d'_2 \leq -K_2 \times n'_2 \times S'_4/\beta_2$$

$$K_1 \times \frac{S'_4/Fe'}{\sqrt{1 - \left(\frac{1}{2Fe'}\right)^2}} \leq \phi_3 \leq K_2 \times \frac{S'_4/Fe'}{\sqrt{1 - \left(\frac{1}{2Fe'}\right)^2}}$$

$$K_1 \times \phi_3 \times \frac{S_3\beta_2 - S'_4}{S'_4/\beta_2} \leq \phi_4 \leq K_2 \times \phi_3 \times \frac{S_3\beta_2 - S'_4}{S'_4/\beta_2}$$

in which:

$r_3$ is the radius of curvature of the first face of the second bar lens;
$r_4$ is the radius of curvature of the second face thereof;
$d_2'$ is the axial thickness between the first and second faces thereof;
$\phi_3$ is the effective diameter thereof;
$\phi_4$ is the size of the projected image;
$n_2'$ is the refractive index of the material of the second bar lens for the design wavelength;
$\beta_2$ is the lateral magnification of the second bar lens;
$S_3$ is the axial distance from the first face of the second bar lens to the intermediate image plane;
$S_4'$ is the axial distance from the second face of the second bar lens to the projection plane;
$Fe'$ is the effective F-number at the image field side;
$K_1$ is 0.9; and
$K_2$ is 1.1.

5. A projecting device according to claim 4, wherein $r_3 = -r_2$, $r_4 = -r_1$, $d_2' = d_1'$, $n_2' = n_1'$, $\phi_3 = \phi_1$ $\phi_4 = \phi_0$, $\beta_2 = 1/\beta_1$, $S_3 = -S_2'$, $S_4' = -S_1$ and $Fe' = Fe$.

6. A projecting device according to claim 2, wherein the first bar lens satisfies at the entrance side the following conditions:

$$-K_1 \times S_1 \times (n'_1 - 1) \leq r_1 \leq -K_2 \times S_1 \times (n'_1 - 1)$$

$$K_2 \times S_1 \times \beta_1 \times (1 - n'_1) \leq r_2 \leq K_1 \times S_1 \times \beta_1 \times (1 - n'_1)$$

$$2 \times K_1 \times n'_1 \times S_1 \times \beta_1 \leq d'_1 \leq 2 \times K_2 \times n'_1 \times S_1 \times \beta_1$$

$$K_1 \times \frac{-S_1/Fe}{\sqrt{1 - \left(\frac{1}{2Fe}\right)^2}} \leq \phi_1 \leq K_2 \times \frac{-S_1/Fe}{\sqrt{1 - \left(\frac{1}{2Fe}\right)^2}}$$

$$-K_1 \times \frac{\phi_1}{\beta_1} \leq \phi_0 \leq -K_2 \times \frac{\phi_1}{\beta_1}$$

in which:

$r_1$ is the radius of curvature of the first face of the first bar lens;
$r_2$ is the radius of curvature of the second face thereof;
$d_1'$ is the axial thickness between the first and second faces thereof;
$\phi_1$ is the effective diameter thereof;
$\phi_0$ is the size of the object;
$n_1'$ is the refractive index of the material of the first bar lens for the design wavelength;
$\beta_1$ is the lateral magnification of the first bar lens;
$S_1$ is the axial distance from the first face of the first bar lens to the object;
$S_2'$ is the axial distance from the second face of the first bar lens to the intermediate image plane;
$Fe$ is the effective F-number of the object side;
$K_1$ is 0.9; and
$K_2$ is 1.1;

and wherein the second bar lens at the exit side satisfies the following conditions:

$$K_1 \times S'_4 \times \frac{1}{\beta_2} \times (1 - n'_2) \leq r_3 \leq K_2 \times S'_4 \times \frac{1}{\beta_2} \times (1 - n'_2)$$

$$K_2 \times S'_4 \times (1 - n'_2) \leq r_4 \leq K_1 \times S'_4 \times (1 - n'_2) -$$

$$2 \times K_1 \times n'_2 \times S'_4 \times \frac{1}{\beta_2} \leq d'_2 \leq -2 \times K_2 \times n'_2 \times S'_4 \times \frac{1}{\beta_2}$$

$$K_1 \times \frac{S'_4/Fe'}{\sqrt{1 - \left(\frac{1}{2Fe'}\right)^2}} \leq \phi_3 \leq K_2 \times \frac{S'_4/Fe'}{\sqrt{1 - \left(\frac{1}{2Fe'}\right)^2}}$$

$$K_1 \times \beta_2 \times \phi_3 \leq \phi_4 \leq -K_2 \times \beta_2 \times \phi_3$$

in which:

$r_3$ is the radius of curvature of the first face of the second bar lens;
$r_4$ is the radius of curvature of the second face of the second bar lens;
$d_2'$ is the axial thickness between the first and second faces of the second bar lens;
$\phi_3$ is the effective diameter thereof;
$\phi_4$ is the size of the projected image;
$n_2'$ is the refractive index of the material of the second bar lens for the design wavelength;
$\beta_2$ is the lateral magnification of the second bar lens;
$S_3$ is the axial distance from the first face of the second bar lens to the intermediate image plane;
$S_4'$ is the axial distance from the second face of the second bar lens to the projection plane; and
$Fe'$ is the effective F-number at the image field side.

7. A projecting device according to claim 6, wherein $r_3 = -r_2$, $r_4 = -r_1$, $d_2' = d_1'$, $n_2' = n_1'$, $\phi_3 = \phi_1$, $\phi_4 = \phi_0$, $\beta_2 = 1/\beta_1$, $S_3 = -S_2'$, $S_4' = -S_1$ and $Fe' = Fe$.

* * * * *

UNITED STATES PATENT AND TRADEMARK OFFICE
CERTIFICATE OF CORRECTION

PATENT NO. : 4,426,132
DATED : January 17, 1984
INVENTOR(S) : ATSUO TSUNODA, ET AL.

It is certified that error appears in the above-identified patent and that said Letters Patent is hereby corrected as shown below:

On the Title Page, under "[75] Inventors:" "Mikid" should read --Mikio--.

Column 1, line 49, "system" should read --systems--.

Column 3, line 25, "$\phi$" (all occurrences) should read --$\psi$--;
line 29, "$\phi$" should read --$\psi$--;
line 32, "$\phi$" should read --$\psi$--;
line 45, "$\phi$" should read --$\psi$--;
line 57, "$\phi$" (first occurrence) should read --$\psi$--.

Column 4, line 67, "$\phi$" (all occurrences) should read --$\psi$--.

Column 5, line 5, "$\phi$" should read --$\psi$--;
line 8, "$\phi$" should read --$\psi$--;
line 24, "$\phi$" should read --$\psi$--;
line 35, "$\phi$" (first occurrence) should read --$\psi$--.

Column 6, line 1, "losing" should read --the--;
line 2, delete "the".

Column 8, line 18, "$\phi$" (all occurrences) should read --$\psi$--;
line 22, "$\phi$" should read --$\psi$--;
line 25, "$\phi$" should read --$\psi$--;
line 36, "$\phi$" should read --$\psi$--;
line 38, "$\phi$" should read --$\psi$--;
line 55, "$\phi$" should read --$\psi$--.

UNITED STATES PATENT AND TRADEMARK OFFICE
CERTIFICATE OF CORRECTION

PATENT NO. : 4,426,132

DATED : January 17, 1984

INVENTOR(S) : ATSUO TSUNODA, ET AL.

It is certified that error appears in the above-identified patent and that said Letters Patent is hereby corrected as shown below:

Column 9, line 36, "$\phi$" (all occurrences) should read --$\psi$--;
line 40, "$\phi$" should read --$\psi$--;
line 43, "$\phi$" should read --$\psi$--;
line 55, "$\phi$" should read --$\psi$--;
line 58, "$\phi$" should read --$\psi$--.

Column 10, line 5, "$\phi$" should read --$\psi$--.

Column 12, line 9, "references" should read --reference--.

Column 13, line 26, "that" should read --with--.

UNITED STATES PATENT AND TRADEMARK OFFICE
CERTIFICATE OF CORRECTION

PATENT NO. : 4,426,132
DATED : January 17, 1984
INVENTOR(S) : ATSUO TSUNODA, ET AL.

It is certified that error appears in the above-identified patent and that said Letters Patent is hereby corrected as shown below:

Please add Claim 8:

--8. A projecting device, comprising:

plural element lens systems, each system being composed of at least one bar lens adapted for imaging a part of the object as a part of a corresponding projected image, each bar lens having an axial length larger than its effective diameter, said plural element lens systems when viewed from their entrance ends, being arranged in at least two rows and in a staggered fashion with one row displaced relative to the adjacent row by a distance equal to half the pitch of the adjacent row;

means for arranging each row of said plural element lens systems regularly in a particular direction perpendicular to the optical axes of said systems; and an opaque material filled in the space between the rows of said element lens systems for preventing light from entering into the space.--

On the title page "7 Claims" should read --8 Claims--.

Signed and Sealed this

Seventh Day of August 1984

[SEAL]

Attest:

GERALD J. MOSSINGHOFF

Attesting Officer

Commissioner of Patents and Trademarks